April 15, 1947.
F. E. CREVER
2,419,058
POLYPHASE SPEED SYNCHRONIZING SYSTEM FOR
A PLURALITY OF ROTATING MACHINES
Filed July 13, 1944

Inventor:
Frederick E. Crever,
by Harry E. Dunham
His Attorney.

Patented Apr. 15, 1947

2,419,058

UNITED STATES PATENT OFFICE 2,419,058

POLYPHASE SPEED SYNCHRONIZING SYSTEM FOR A PLURALITY OF ROTATING MACHINES

Frederick E. Crever, Scotia, N. Y., assignor to General Electric Company, a corporation of New York Application July 13, 1944, Serial No. 544,779

14 Claims. (Cl. 172—293)

1

This invention relates to speed control systems and more particularly to improvements in systems for automatically synchronizing a plurality of rotating machines.

The invention is characterized by two or more polyphase alternators. These alternators may either be the main machines to be synchronized or they may be pilot machines which are driven by separate main machines which are to be synchronized. Ordinarily one alternator acts as a master machine whose speed is to be followed and matched by the other alternator. The invention is further characterized by predetermined interconnections between certain of the phases of the alternators for responding respectively to a difference in average speed between the alternators and to a difference in phase of the alternators when their average speed is the same. These two responses are made to operate suitable means for controlling the speed of the following alternator so as to synchronize it with the master alternator.

An object of the invention is to provide a new and improved automatic speed control system.

A further object of the invention is to provide a new and improved automatic speed synchronizer system for a plurality of rotating machines.

The invention will be better understood from the following description taken in connection with the accompanying drawing and its scope will be pointed out in the appended claims.

Figure 1:
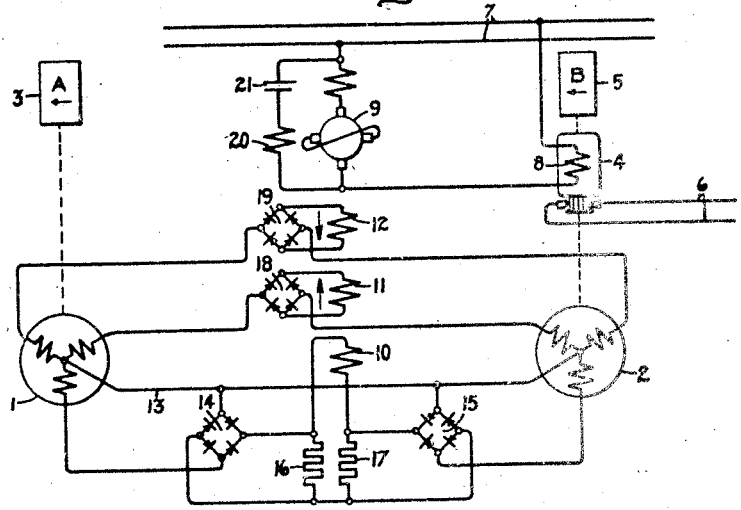
Figure 2:
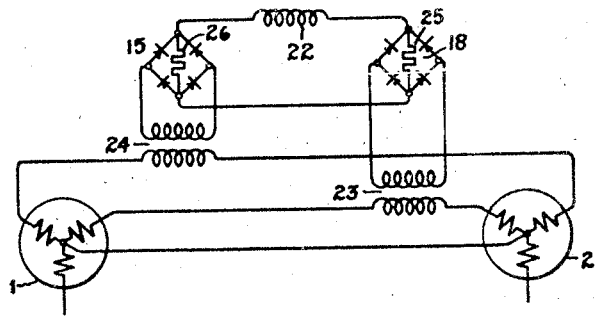

In the drawing Fig. 1 illustrates diagrammatically an embodiment of the invention, and Fig. 2 is a modification.

Referring now to the drawing, and more particularly to Fig. 1, the two alternators are shown by way of example as three-phase alternators 1 and 2. Alternator 1 will be assumed to be the speed reference alternator and alternator 2 will therefore be the one whose speed is controlled so as to synchronize it with alternator 1. Alternator 1 may be driven by any suitable means, such, for example, as by a roller 3 of a paper machine. Likewise, alternator 2 may be driven by any suitable means and by way of example it is driven by a direct-current motor. Assuming that the invention is applied to a paper making machine, then motor 4 can also drive another roll 5 of the paper making machine. In such machines it is very important that the speed of the rolls be exactly the same and in a system of this kind the alternators 1 and 2 can be small pilot devices which are excited by permanent magnets. The motor is shown as separately excited, it having a main supply circuit 6

2 for its armature and an excitation bus 7 for energizing its field winding 8. The voltage of the excitation bus 7 is preferably such that the motor 4 will drive the alternator 2 at substantially the same speed as the alternator 1 under normal or average operating conditions. The speed of the motor 4 is controlled by a buck and boost generator 9 connected in series with the field winding 8. This buck and boost machine may be of any suitable type, such, for example, as the compensated armature-reaction excited type described and claimed in Patents 2,227,992—Edwards and 2,247,166—Edwards and Alexanderson, and Thompson, both of which patents are assigned to the assignee of this application.

The voltage of the machine 9, and hence the speed of motor 4, are controlled by a plurality of control field windings 10, 11 and 12 for the generator 9. Control field winding 10 is energized in accordance with the difference in average speeds of the alternators 1 and 2 and control field windings 11 and 12, which act differentially or in opposition to each other, produce a net or resultant control effect which is responsive to a difference in phase of the alternators when they are out of synchronism but are rotating at the same average speed.

Alternators 1 and 2 are shown by way of example as having wye-connected armature windings whose neutrals are shown directly interconnected by means of a conductor 13. Control field winding 10 is energized in accordance with the arithmetical difference between the voltages of corresponding phases of alternators 1 and 2. By "corresponding phases" is meant phases whose voltages are in phase with each other when the alternators are in synchronism. Rectifiers 14 and 15 are connected respectively to these corresponding phases of alternators 1 and 2 and separate resistors 16 and 17 are connected across the output terminals of these rectifiers. The field winding 10 is connected in a closed series circuit including these two rectifiers 14 and 15 with their polarities in opposition.

Control field winding 11 is energized in accordance with the magnitude of the vector resultant of the voltages of two of the phases of the alternators 1 and 2 which are out of phase when these alternators are in phase. For example, this field winding is energized by the magnitude of the vector difference between the voltages of such phases of alternators 1 and 2 that the voltage of the phase of alternator 1 lags the voltage of the phase of alternator 2 when the alternators are in phase. Control field winding 12 is energized similarly to control field winding 11 except that the voltage of the phase of alternator 1 to which it is connected leads the voltage of the phase of alternator 2 when the alternators are in phase. As shown, the control field winding 11 is connected in series with two of the phases of the alternators 1 and 2 through a rectifier 18 and the neutral interconnection 13, and similarly the control field winding 12 is connected in series with another pair of phases of respective alternators through a rectifier 19 and the neutral interconnection 13. The controlling effects of field windings 11 and 12 oppose each other and are equal when the alternators are synchronized and in phase, as indicated by the equal length oppositely pointing arrows shown associated with them.

The system is prevented from hunting or overshooting in its regulating action by means of an additional control field winding 20 for the buck and boost generator 9, this field winding being energized by the armature voltage of the generator 9 through a capacitor 21 so that only when the armature voltage of the machine 9 is changing will the winding 20 be energized and its connections are such that this transient energization of the winding 20 produces a change in excitation of the machine 9 which opposes the original change in armature voltage.

The operation of Fig. 1 is as follows: The circuit of control field winding 10 is so proportioned that when the alternators 1 and 2 are operating at the same average speed, then the voltage drops in the resistors 16 and 17 are equal and opposite so that the control field winding 10 is deenergized. If, however, the alternator 2 runs slower than alternator 1, then the voltage drop in resistor 17 will be less than that in resistor 16 and the resulting energization of the control field winding 10 will be such as to cause generator 9 to produce a bucking voltage; that is to say, it produces a voltage which opposes the voltage of the excitation bus so that the excitation of the motor 4 is decreased so that the motor speeds up and hence increases the speed of the alternator 2. Conversely, if the speed of alternator 2 is greater than that of alternator 1, then the voltage drop in resistor 17 will be greater than that of resistor 16 and the field winding 10 will carry current in the opposite direction, thus reversing the polarity of the generator 9 and causing it to boost the voltage of the excitation bus and thus raise the excitation of the motor 4 which then causes it to reduce its speed and thus reduce the speed of the alternator 2.

Assume now that the phase rotations of alternators 1 and 2 are both counterclockwise, as viewed in the drawing, and assume further that the alternators are in synchronism and in phase. Under these conditions control field windings 11 and 12 will be equally and oppositely energized and thus will produce no controlling effect. Control field winding 11, however, tends to increase the voltage of the generator 9 in the boosting direction so as to decrease the speed of the motor 4 and control field winding 11 acts in the opposite direction and tends to increase the voltage of the generator 9 in the bucking direction so as to decrease the excitation of the machine 4 and increase its speed. Assume now that alternator 2 begins to lag alternator 1 in phase. This will cause a decrease in the energization of field winding 11 because the phase angle between the voltages of the phases of the alternators 1 and 2 to which this winding is connected will decrease so that their vector difference will decrease in magnitude. Consequently, the speed decreasing effect of winding 11 will decrease. At the same time the energization of field winding 12 will increase because the phase angle between the voltages of the phases of the alternators 1 and 2 increases and consequently the vector difference between these voltages increases. Therefore, the speed increasing effect of control field winding 12 increases. Therefore, the algebraic difference between the effects of control field windings 11 and 12 will be in such a direction as to cause an increase in speed of the motor 4 so as to make the alternator 2 advance in phase relative to alternator 1 and thus maintain synchronism with alternator 1. Similarly, if alternator 2 advances in phase relative to alternator 1 the energization of control field winding 11 will increase and the energization of control field winding 12 will decrease, thus reversing the sine of the algebraic difference in their energizations with the result that alternator 2 will momentarily slow down and will swing back to maintain synchronism with alternator 1.

It is possible for field windings 11 and 12 to have equal energizations if alternator 2 should be operating exactly 180 degrees out of phase with alternator 1 but this would be an unstable operating point because as soon as the alternators 1 and 2 got the slightest bit more or less than 180 degrees out of phase, the algebraic difference in the energizations of the windings 11 and 12 would automatically operate to swing the alternator 2 back into zero phase displacement with respect to alternator 1 and, as has been shown above, the operation is stable about the zero phase displacement condition which is the condition referred to as in phase.

It will be noted that control field winding 10 acts somewhat like an amortisseur winding in that it damps out or opposes changes in relative speed of the alternators.

Although the alternators 1 and 2 have been shown as three-phase machines, they can be any type of polyphase machine having a greater or lesser number of phases.

If the means 3 and 4 are separate rollers of a paper making machine their relative speeds can be varied, if desired, by producing suitable speed changing drives between one of them and its associated alternator. For example, a conventional cone pulley type variable speed drive can be used between roller 5 and the motor 4.

In the modification shown in Fig. 2 the control field windings 11 and 12 have been combined into a single control field winding 22. This is done by energizing the rectifiers 18 and 19 through insulating transformers 23 and 24 and connecting resistors 25 and 26 across the outputs of the respective rectifiers. The combined control field winding 22 is connected in a closed circuit including the resistors 25 and 26 with their polarities opposed, this connection being similar to the connection by which the control field winding 10 is energized. The operation of Fig. 2 is essentially the same as that of Fig. 1, the control field winding 22 carrying no current when the alternators 1 and 2 are in synchronism and carrying currents in opposite directions depending upon whether alternator 2 leads or lags alternator 1, the magnitude of this current being proportional to the phase displacement up to a predetermined angle.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a pair of separately-driven polyphase alternators, means for changing the speed of one alternator, a pair of differentially-acting control elements for said speed-changing means, means for energizing one of said elements in accordance with the vector resultant of a phase voltage of each of said alternators, and means for energizing the other of said elements in accordance with the vector resultant of another phase voltage of each of said alternators, said vector resultants changing in magnitude oppositely with a change in relative phase of said alternators, said control elements neutralizing each other when said alternators are in phase.

2. In combination, two separately-driven polyphase alternators, means for producing a voltage which is proportional in magnitude to the vector resultant of the voltages of two phases of the respective alternators which phases are angularly displaced when the alternators are in phase, means for producing a second voltage which is proportional in magnitude to the vector resultant of the voltages of two other phases of the respective alternators which other phases are angularly displaced when the alternators are in phase, and means responsive to the algebraic difference between said resultant voltages for controlling the relative speed of said alternators.

3. In combination, two separately-driven polyphase alternators, means for producing a voltage which is proportional in magnitude to the vector resultant of the voltages of two phases of the respective alternators which phases are angularly displaced when the alternators are in phase, means for producing a second voltage which is proportional in magnitude to the vector resultant of the voltages of two other phases of the respective alternators which other phases are oppositely angularly displaced when the alternators are in phase, and means responsive to the algebraic difference between said resultant voltages for controlling the relative speed of said alternators.

4. In combination, a pair of separately-driven polyphase alternators, means for changing the speed of one of said alternators, a speed increasing control element for said speed changing means energized in accordance with the magnitude of the vector difference between the voltages of two phases of the respective alternators which respectively have a leading-lagging phase relation when said alternators are in phase, and a speed decreasing control element for said speed changing means energized in accordance with the magnitude of the vector difference between the voltages of two phases of the respective alternators which voltages have a lagging-leading phase relation when said alternators are in phase.

5. In combination, a speed reference machine, a direct-current motor, speed adjusting means for said motor including a dynamo-electric exciter having a pair of differentially acting control fields, means responsive to a difference in average speeds of said reference machine and said motor for controlling the speed of said motor so as to make said average speeds equal, and means responsive to a difference in phase angle of said machine and motor when their average speeds are equal for controlling said motor so as to reduce said difference in phase angle to a minimum value.

6. In combination, a polyphase alternator driven at a reference speed, a second polyphase alternator, means for driving said second alternator at the same average speed as said reference speed, and control means for said driving means responsive to an angular displacement of said second alternator from in phase relationship with said first machine for controlling said driving means so as to reduce said angular displacement, said control means including a dynamo-electric exciter having a plurality of differentially acting control elements.

7. In combination, a pair of separately-driven polyphase alternators, means for varying the speed of one of said alternators, and control means for said speed varying means connected to be responsive to the algebraic difference between two voltages the magnitude of each of which is equal to the vector resultant of two different phase voltages of the respective alternators.

8. In combination, a pair of separately-driven polyphase alternators, means for varying the speed of one of said alternators, and control means for said speed varying means connected to be responsive to the algebraic difference between two voltages the magnitude of each of which is equal to the vector resultant of two different phase voltages of the respective alternators, said two phase voltages of each resultant having an opposite phase difference when said alternators are in phase.

9. In combination, a pair of separately-driven polyphase alternators, means for varying the speed of one of said alternators, and control means for said speed varying means connected to be responsive to the algebraic difference between two voltages the magnitude of each of which is equal to the vector resultant of two different phase voltages of the respective alternators, said two resultant voltages being equal when said alternators are in phase.

10. In combination, a pair of separately-driven polyphase alternators, means for varying the speed of one of said alternators, and control means for said speed varying means connected to be responsive to the algebraic difference between two voltages the magnitude of each of which is equal to the vector difference of two different phase voltages of the respective alternators.

11. In combination, a pair of separately-driven polyphase alternators, means for varying the speed of one of said alternators, and control means for said speed varying means connected to be responsive to the algebraic difference between two voltages the magnitude of each of which is equal to the vector difference of two phase voltages of the respective alternators, said two phase voltages of each vector difference having an opposite phase difference when said alternators are in phase.

12. In combination, a pair of separately-driven polyphase alternators, means for varying the speed of one of said alternators, and control means for said speed varying means connected to be responsive to the algebraic difference between two voltages the magnitude of each of which is equal to the vector difference of two phase voltages of the respective alternators, said two vector difference voltages being equal when said alternators are in phase.

13. In combination, a pair of alternators, a motor for driving one of said alternators, separate means for driving the other alternator, means for varying the speed of said motor, means for controlling said speed varying means in accordance with the algebraic difference between the voltages of two of the phases of said alternators which are in phase when said alternators are in phase, and additional means for controlling said speed varying means in accordance with the algebraic difference between two resultant voltages, one of said resultant voltages being proportional in magnitude to the vector resultant of the voltages of two of the remaining phases of each of said alternators which are out of phase when said alternators are in phase, the other of said resultant voltages being proportional in magnitude to the vector resultant of the voltages of the remaining two phases of said alternators.

14. In combination, a pair of wye-connected alternators, a direct-current motor for driving one of said alternators, separate means for driving the other alternator, a buck and boost series exciter for controlling the speed of said motor, means for exciting said exciter in accordance with the algebraic difference between the voltages of two of the phases of said alternators which are in phase when said alternators are in phase, and additional means for exciting said exciter in accordance with the algebraic difference between two resultant voltages, one of said resultant voltages being proportional in magnitude to the vector difference between the voltages of a remaining phase of each of said alternators which voltages are out of phase when said alternators are in phase, the other of said resultant voltages being proportional in magnitude to the vector difference between the voltages of the remaining two phases of said alternators.

FREDERICK E. CREVER.

REFERENCES CITED

The following references are of record in the file of this patent:

UNITED STATES PATENTS

| Number | Name | Date |
|---|---|---|
| 1,718,454 | Conwell | June 25, 1929 |
| 2,114,859 | Schaelchlin | Apr. 19, 1938 |
| 584,062 | Parshall | June 8, 1897 |